Oct. 21, 1947.  H. PETERSEN  2,429,564
TOOLHOLDER
Filed Sept. 6, 1945
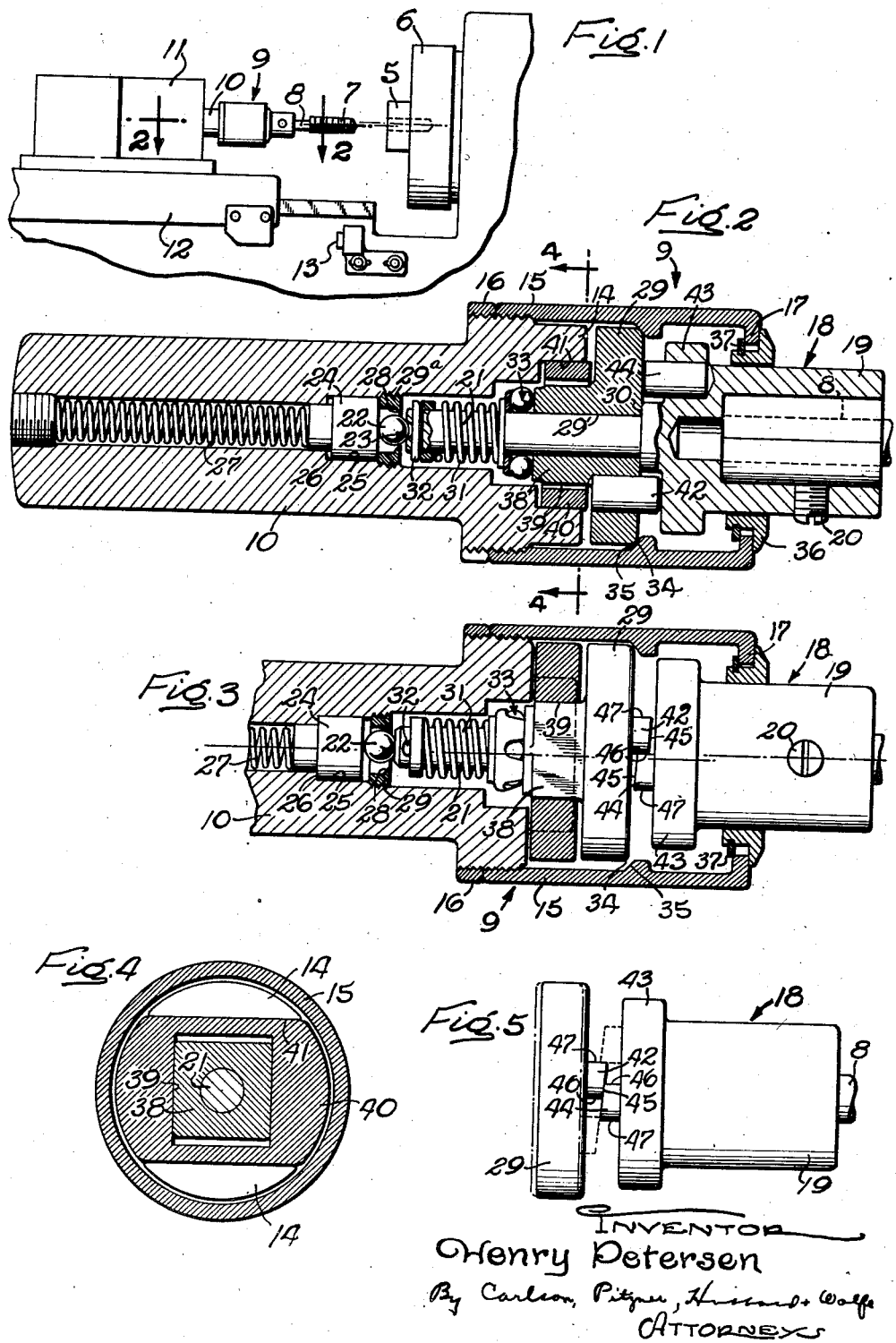
INVENTOR
Henry Petersen
By Carlson, Pitzner, Hubbard + Wolfe
ATTORNEYS Patented Oct. 21, 1947

2,429,564

UNITED STATES PATENT OFFICE 2,429,564

TOOLHOLDER

Henry Petersen, South Beloit, Ill.

Application September 6, 1945, Serial No. 614,781

4 Claims. (Cl. 10—89)

This invention relates to holders for reaming, countersinking, counterboring, drilling, hollow milling and threading tools, and the general object is to provide a holder in which the tool supported thereby is normally held in a centered position but is freed for floating angular or lateral movement under the thrust incident to entering the work.

A more detailed object is to provide a holder of the above character in which the tool centering action and release thereof are effected by relative axial movement between the holder parts incident to application and release of an end thrust to the tool as it enters and leaves the work.

The invention also resides in the novel construction of the centering means.

A further object is to provide a tap holder which releases automatically when the tap reaches a predetermined depth in the work, reengagement of the driving connection taking place automatically upon reversal of the applied torque.

Other objects and advantages of the invention will become apparent from the following detailed description taken in connection with the accompanying drawings, in which Figure 1 is a fragmentary elevational view of a tapping machine equipped with a tool holder embodying the present invention.

Fig. 2 is a longitudinal diametrical sectional view of the holder.

Fig. 3 is a similar but fragmentary view illustrating a different position of the parts.

Fig. 4 is a section taken along the line 4—4 of Fig. 2.

Fig. 5 shows a portion of Fig. 3 with the parts in a different position.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

The improved tool holder is usable in any machine for forming or shaping holes, in which machine either the work or tool rotates and one or the other is fed axially to bring the two into and out of cutting engagement. In the turret lathe illustrated, the work 5 is supported in a rotary chuck 6 and the tool, such as a tap 7, is supported from its shank 8 in the improved holder 9. The latter has a shank 10 received in a suitable socket in a turret 11 or other suitable support. In this instance, the tool is fed into the work by moving the slide 12 until a stop 13 on the machine bed is encountered.

The holder shank 10 is formed with a head 14 threaded into the rear end of a casing or shell 15 and locked thereto by a nut 16. The forward end of the casing has an inturned flange 17 defining an opening through which a chuck or tool supporting member 18 projects. The outwardly projecting end 19 of this chuck is recessed to receive the tool shank 8 which is held by a set screw 20. The rear end portion 21 is of reduced diameter and cylindrical and is supported within the casing 15 for bodily lateral movement or for pivotal movement about a transversely extending axis at its extreme rear end. This mounting and the transverse pivot are formed in part by a ball 22 engageable on one side with a conical seat 23 in the end of the cylindrical portion 21. On its other side, the ball bears against the flat forward end of a plunger 24 slidable in a bore 25 of the holder shank 10 and concentric with the axis thereof. The plunger is limited in its rearward motion by a shoulder 26 and is urged forwardly by a compression spring 27 which, when the plunger is free to move, forces the ball 22 into a seat 28 formed by a nut 29ª threading into the bore 25. The ball, and therefore the rear end of the member 18, is centered with respect to the axis of the shank 10.

Under the rearwardly directed end thrust which is exerted on the tool and the chuck member 18 as the tool enters the work, the ball and the plunger 24 are pushed rearwardly against the action of the spring 27 until the shoulder 26 is encountered. Thus, the ball is freed from its seat 28 and together with the rear end of the member 18 is freely shiftable laterally across the forward end surface of the plunger. In this way, the ball transmits the end thrust on the tool to the plunger and shoulder while at the same time allowing either for pivoting of the member 18 about the ball center as a transverse axis or for bodily shifting of the member by rolling of the ball along the forward end of the plunger.

Provision is made for automatically centering the central portion of the chuck member 18 in the casing 15. To this end, the cylindrical portion 21 is journaled in the central bore 29' of a disk 29 which is urged forwardly against a shoulder 30 by a compression spring 31. The latter acts between a crosspin 32 on the rear end of the portion 21 and a ball thrust bearing 33 at the end of a hub 38 on the disk 29. In the foremost position of the disk 29, the peripheral edge 34 of the disk bears against an inturned conical surface 35 on the casing 15 concentric with the casing axis so as to center the disk and therefore the forward end portion of the chuck 18. The disk is, however, shifted rearwardly with the member 18 under the thrust on the tool so that this centering means, like the ball seat 28, is disabled automatically as an incident to entry of the tool into the work. Such lateral shifting of the member 18 is permitted by a collar 36 loosely encircling the holder end 19 and held against the casing flange 17 by a snap ring 37.

A driving or torque transmitting connection is provided between the disk 29 and the shank 10 while permitting freedom of the lateral and angular shifting of the tool above described. For this purpose, the hub 38 is made of rectangular cross section and is slidable in ways 39 on a crosspiece 40 which in turn is slidable in perpendicular ways 41 formed on the interior of the shank head 14.

In the present instance, the member 18 and the disk 29 are made as separate parts to permit of disconnection of the two under certain conditions encountered in tapping. Such a connection is formed in the present instance by pins 42 offset from the axis of and projecting forwardly from the disk 29 for side-to-side engagement with similar pins 44 projecting rearwardly from a flange 43. The flat ends 45 of the pins 42 and 44 are inclined relative to a perpendicular to the pins so that in the direction of torque application during normal operation of the tool on the work, the short sides 46 of the pins engage each other as shown in Fig. 3. However, when the member 18 is pulled forwardly and away from the disk 29, the short sides 46 of the pins will pass each other and the ends 45, acting as cams, will spread the member 18 and the disk 29 farther apart (Fig. 5) and eventually the pins will pass each other, thus allowing for independent rotation of the member 18. Such engagement of the ends 45 occurs in each revolution of the tool.

Upon reverse relative rotation between the tool and the work, the long sides 47 of the pins 42 and 44 are brought into engagement, thereby reestablishing the driving connection between the member 18 and the holder shank 10.

In an ordinary tapping cycle, the pins 42 and 44 remain engaged as shown in Fig. 3 as the tap enters the work. When the stop 13 is encountered interrupting the axial feed of the holder proper, the tap 7 continues to turn with the work and therefore is advanced axially and forwardly and with it the member 18. In the one or more revolutions of this rotation of the tap, depending on the pitch of the tap thread, the member 18 is pulled forwardly so that the short sides of the pins 42 and 44 pass each other (Fig. 5), the drive connection between the tap and its holder being broken so that the tap continues to turn with the work. On reversal of the direction of work rotation, the long sides 47 of the pins 42 and 44 engage so that the tap is held against turning and therefore is retracted from the rotating work.

In the operation of the tool holder for other cutting processes, it will be apparent that the parts will be positioned as shown in Figs. 1 and 2 as the tool and work approach each other, the tool chuck 18 being alined with the axis of the shank 10 by the action of the conical seats 28 and 35 under the influence of the spring 27.

When the tool encounters the work so as to subject the tool and holder to an endwise and rearwardly directed thrust, the member 18 is shifted axially until the plunger 24 encounters the shoulder 26, the disk 29 and the ball 22 being carried away from the conical seats so as to free the tool and its supporting member 18 for either angular tilting or bodily lateral movement as may be required in order to aline the tool with the hole in the work. After completion of the cutting operation and withdrawal of the tool from the work, the parts are again free to move under the influence of the spring 27 and become recentered by the conical surfaces 28 and 35.

I claim as my invention:

1. A tool holder having, in combination, a hollow casing, a plunger slidable axially in said casing and yieldably urged toward an open end of said casing, means positively limiting the inward movement of said plunger, a ball engaging the outer end of said plunger, a conical surface on said casing engaging said ball to center the same when said plunger is urged forwardly, a member within said casing having a conical center seat at one end engaging said ball, the other end projecting from said casing and adapted to receive the shank of a cutting tool, a second member within said casing slidable axially on said first member and yieldably urged outwardly therealong, surfaces on said second member and casing engageable to center the outer end portions of said members in said casing, said members, when shifted axially and inwardly to move said second member and said ball away from said conical surfaces, being adapted to float angularly or laterally, and means providing a positive drive connection between said casing and said first member in all positions of the latter.

2. A tool holder having, in combination, a hollow casing, a plunger slidable axially in said casing, means yieldably urging said plunger toward an open end of said casing, means positively limiting the inward movement of said plunger, a ball engaging the outer end of said plunger, a member within said casing engaging at one end with said ball, the other end projecting from said casing and adapted to receive the shank of a cutting tool, means operating under the influence of said yielding means to center said ball laterally of said plunger when the latter is urged forwardly, a second member within said casing slidable axially on said first member and yieldably urged outwardly therealong, surfaces on said second member and casing engageable to center the outer end portions of said members in said casing, said members, when shifted axially and inwardly to move said second member and said ball, being adapted to float angularly or laterally, and means providing a positive drive connection between said casing and said first member in all positions of the latter.

3. A tool holder having, in combination, a hollow casing, a ball yieldably urged toward an open end of said casing, a member within said casing engageable at one end with said ball, the other end projecting from said casing and adapted to receive the shank of a cutting tool, means normally tending to center said ball laterally with respect to said casing, a second member within said casing slidable axially on said first member and yieldably urged outwardly therealong, means normally acting to center the outer end portions of said members in said casing, said members, when shifted axially and inwardly, being adapted to float angularly or laterally, and means providing a positive drive connection between said casing and said first member in all positions of the latter.

4. A tool holder having, in combination, a casing having a longitudinal axis, means within said casing including a ball and providing a pivot shiftable laterally and axially, a member within said casing having its inner end pivoted on said ball, the outer end being adapted to receive a rotary cutting tool and shiftable laterally within the casing, means yieldably urging said ball and member axially in an outward direction, a stop limiting the inward movement of said member and ball when said yieldable means is overcome by the end thrust on said member, a conical surface on said casing coacting with said ball to center the same in said casing under the action of said yieldable means, a second conical surface acting under the influence of said yieldable means to center the forward end of the member, and means providing a positive drive connection between said casing and said member while permitting of axial, angular, and lateral floating thereof relative to said casing.

HENRY PETERSEN.

REFERENCES CITED

The following references are of record in the file of this patent:

UNITED STATES PATENTS

| Number | Name | Date |
| --- | --- | --- |
| 664,513 | Wallace | Dec. 25, 1900 |
| 1,290,427 | Velk | Jan. 7, 1919 |
| 1,566,553 | Maisch | Dec. 22, 1925 |
| 2,188,205 | Osborne | Jan. 23, 1940 |